UNITED STATES PATENT OFFICE.

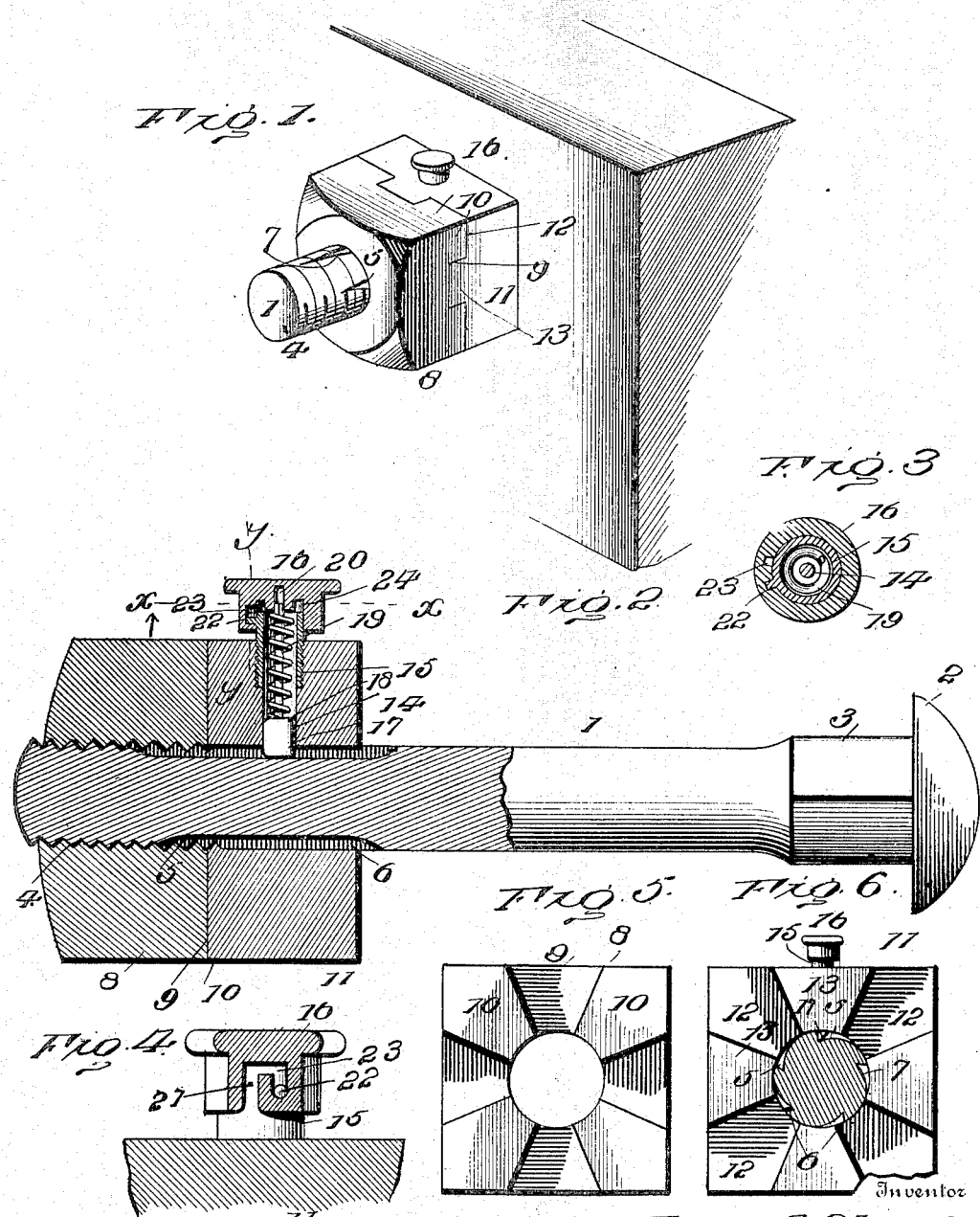

ERVIN A. SHUFF, OF MATHEWSON, OKLAHOMA TERRITORY.

NUT-LOCK.

SPECIFICATION forming part of Letters Patent No. 661,558, dated November 13, 1900.

Application filed May 15, 1900. Serial No. 16,825. (No model.)

*To all whom it may concern:*

Be it known that I, ERVIN A. SHUFF, a citizen of the United States, residing at Mathewson, in the county of Canadian, Oklahoma Territory, have invented certain new and useful Improvements in Nut-Locks; and I do hereby declare the following to be a full, clear, and exact description of the invention, such as will enable others skilled in the art to which it appertains to make and use the same.

This invention has relation to means for preventing the loosening of nuts and bolts after the same have been properly positioned and tightened, and has for its object to provide simple and effective devices for attaining the object aforesaid and which are easily operable and certain and positive in action.

For a full description of the invention and the merits thereof, and also to acquire a knowledge of the details of construction of the means for effecting the result, reference is to be had to the appended description and drawings hereto attached.

While the essential and characteristic features of the invention are necessarily susceptible of modification, still the preferred embodiment of the invention is illustrated in the accompanying drawings, in which—

Figure 1 is a perspective view showing the application of the invention. Fig. 2 is a side elevation, parts being broken away. Fig. 3 is a section on the line X X of Fig. 2 looking in the direction of the arrow. Fig. 4 is a detail section on the line Y Y of Fig. 2. Fig. 5 is a view in elevation of the inner side of the nut. Fig. 6 is a detail view of the washer looking at the side having the projections to match with the inner side of the nut.

Corresponding and like parts are referred to in the following description and indicated in all the views of the drawings by the same reference characters.

The bolt 1 is provided at one end with a head 2 and shouldered portion 3, and its opposite end is threaded for a short distance from its end, as shown at 4. The shouldered portion 3 is designed to prevent the turning of the bolt when positioned with reference to the part to be secured, and may be of angular formation or other desired shape common in devices of this kind. A series of grooves 5 extend lengthwise of the bolt and intersect with the threads thereof, and one wall of the grooves is straight, as shown at 6, to provide an abutting shoulder for the locking pin or dog, and the other wall is inclined, as shown at 7, for the said pin or dog to ride upon when screwing the nut home upon the bolt.

The nut 8 has its openings internally threaded to match the thread 4 of the bolt and is provided upon its inner face with a series of depressions 9 and a corresponding number of projections 10, the latter being disposed at the corners and the recesses intermediate the edges of the nut. The purpose of the projections 10 and depressions 9 is to provide interlocking means between the nut and the washer 11, which is fitted loosely upon the bolt, so as to slide freely over the threaded portion. The washer 11 is preferably of a size corresponding with that of the nut 8, so as to come flush at its edges with the corresponding edges of the nut. Depressions 12 are formed in the outer face of the washer and projections 13 at intermediate points, the projections and depressions alternating and positioned so as to match with the corresponding parts 9 and 10 of the nut 8. When the parts 8 and 11 are mated, they are prevented from relative turning by reason of the interlocking of the coöperating projections and depressions.

A spring-actuated locking pin or dog 14 is fitted to the washer and coöperates with the grooves 5 of the bolt to prevent backward rotation of the nut and washer after these parts have been screwed upon the bolt. This pin or dog is located in an opening formed in a side of the washer and leading into the bolt-opening thereof. A tube 15 is fitted into the side opening of the washer and its outer end projects a short distance to receive a cap 16, removably fitted thereto. The pin or dog is provided at its inner end with a beveled head 17 to operate in a contracted portion of the side opening and an outer portion 18, forming a shoulder to limit the inward movement of the pin under the action of the coil-spring 19, which is mounted upon the said pin and confined between the shouldered portion thereof and the central portion of the cap 16. One side of the head 17 is straight to abut against the shoulder 6 of the grooves 5, and the opposite side is beveled to ride upon the inclined wall 7 of the grooves. The cap 16 is detachably fitted to the projecting end of the tube 15 and is formed centrally with an opening 20 of such cross-sectional outline as to prevent relative turning of the pin or dog 14 and hold the head 17 thereof in proper position to engage with the shouldered portion of the grooves 5. As shown, the opening 20 is of square form, and the outer end of the pin 14 is of corresponding shape to fit therein. A bayonet-joint is provided between the cap 16 and the projecting end of the tube 15 to hold said cap in position, and this joint comprises a reëntrant groove 21 in the inner wall of the rim portion of the cap and a pin 22, projecting laterally from the side of the tube 15, so as to coöperate with the groove 21 and hold the cap 16 in position. When the cap is in position, the pin 22 is seated in the inner end of the return portion 23 of the groove 21 and is held in place by the action of the spring 19, which serves normally to force the cap 16 outward, as well as to move the locking pin or dog 14 inward. It will thus be seen that the spring 19 performs a dual function—namely, to hold the inner end of the dog in engagement with the grooves of the bolt and to retain the pin 22 in the inner end of the return portion 23 of the groove 21, whereby the cap is held in place. A groove 24 is formed in the inner or bottom side of the cap 16 to receive the outer end of the tube 15 when pressing the cap inward, so as to disengage the pin 22 from the return portion 23 of the groove 21 when it is required to remove the cap. When the cap is in place, the parts are so disposed that the head portion of the locking pin or dog will engage squarely with the shoulder 6 of any one of the grooves 5 and prevent unloosening of the nut. When it is required to remove the bolt or nut, the cap 16 is disengaged from the outer end of the tube 15, when the pin or dog 14 can be drawn out of engagement with the bolt and permit the removal of the nut by a wrench or spanner in the well-known manner. In order to prevent weakening of the washer 11 by the provision of the opening therein to receive the tube 15, the latter is located opposite a projection 13. This tube may be secured in the opening of the washer in any substantial manner and as found most economical and convenient.

Having thus described the invention, what is claimed as new is—

1. In a nut-lock, and in combination with the bolt provided in its sides with a series of longitudinally-disposed grooves, means for securing the nut, the same consisting of a spring-actuated locking pin or dog, and a cap for holding the said pin or dog in place and in turn prevented from casual displacement by the actuating-spring of the said dog, substantially as set forth.

2. In a nut-lock, means for preventing unloosening of the nut when tightened, the same consisting of a pin or dog adapted to interlock with the bolt, a cap for holding the dog in place, an approximately bayonet-shaped joint between the cap and the part to which it is fitted, and a spring disposed to exert an outward pressure upon the cap to prevent casual disengagement of the joint and inward pressure against the said dog to hold it in engagement with the bolt, substantially as set forth.

3. In a nut-lock, means for securing the nut, the same consisting of a tube, a pin slidingly mounted in the tube and adapted to coöperate with the bolt, a cap fitted to the outer end of the tube and held thereon by a joint of approximately bayonet form, and a spring mounted upon the pin and confined between the cap and the shouldered portion of the said pin and exerting a pressure in opposite directions against said cap and pin, substantially as and for the purpose set forth.

4. In a nut-lock, a tube and locking-pin loosely mounted in the tube, a cap detachably fitted to the outer end of the tube and having a central opening to receive the outer end of the pin, an approximately bayonet-shaped joint between the cap and tube to retain the former in place, and a spring located in the tube and confined between the cap and shouldered portion of the pin, substantially as set forth.

In testimony whereof I affix my signature in presence of two witnesses.

ERVIN A. SHUFF. [L. S.]

Witnesses:
A. C. SPRINGS,
L. M. STRATTON.